United States Patent
Jessup et al.

(10) Patent No.: US 8,002,348 B2
(45) Date of Patent: Aug. 23, 2011

(54) RESTRAINT SYSTEM FOR A SUSPENDABLE VEHICLE SAFETY SEAT

(75) Inventors: Chris P. Jessup, Sheridan, IN (US); David D. Merrick, Noblesville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 201 days.

(21) Appl. No.: 12/429,941

(22) Filed: Apr. 24, 2009

(65) Prior Publication Data

US 2010/0052401 A1    Mar. 4, 2010

Related U.S. Application Data

(60) Provisional application No. 61/125,328, filed on Apr. 24, 2008.

(51) Int. Cl.
*B60N 2/42* (2006.01)
*B60N 2/427* (2006.01)
*B60R 21/00* (2006.01)

(52) U.S. Cl. .................... 297/216.1; 297/216.13
(58) Field of Classification Search .................. 297/470, 297/471, 472, 216.1, 216.13, 484
See application file for complete search history.

(56) References Cited

U.S. PATENT DOCUMENTS

| | | | | |
|---|---|---|---|---|
| 3,968,863 A * | 7/1976 | Reilly | 297/216.1 X |
| 4,003,534 A * | 1/1977 | Kenigsberg et al. | 297/216.13 X |
| 4,005,765 A * | 2/1977 | Reilly | 297/216.1 X |
| 4,128,217 A * | 12/1978 | Mazelsky | 297/216.1 X |
| 4,150,805 A * | 4/1979 | Mazelsky | 297/216.1 X |
| 4,408,738 A * | 10/1983 | Mazelsky | 297/216.1 X |
| 4,423,848 A * | 1/1984 | Mazelsky | 297/216.1 X |
| 4,474,347 A * | 10/1984 | Mazelsky | 297/216.1 X |
| 6,074,004 A * | 6/2000 | Carmichael | 297/216.13 X |
| 6,076,887 A * | 6/2000 | Andersson | 297/216.1 |
| 6,237,889 B1 * | 5/2001 | Bischoff | 297/216.1 X |
| 6,254,181 B1 * | 7/2001 | Aufrere et al. | 297/216.1 |
| 6,378,939 B1 * | 4/2002 | Knoll et al. | 297/216.1 |
| 6,386,345 B1 * | 5/2002 | Hamilton et al. | 297/216.1 X |
| 6,394,393 B1 * | 5/2002 | Mort | 297/216.1 X |
| 6,585,190 B2 * | 7/2003 | Mort | 297/216.1 X |
| 6,629,575 B2 * | 10/2003 | Nikolov | 297/216.1 X |
| 6,742,838 B1 * | 6/2004 | Swierczewski | 297/216.1 |
| 6,773,075 B2 * | 8/2004 | Rouhana et al. | 297/216.1 X |
| 7,216,931 B2 * | 5/2007 | Friedman | 297/216.1 |
| 7,246,849 B2 * | 7/2007 | Lewis | 297/216.13 X |
| 7,445,181 B2 * | 11/2008 | Knoll et al. | 297/216.1 X |
| 7,469,766 B2 * | 12/2008 | Guo et al. | 297/471 X |
| 7,513,575 B1 * | 4/2009 | Go | 297/216.13 X |
| 7,604,081 B2 * | 10/2009 | Ootani et al. | 297/216.1 X |
| 7,726,733 B2 * | 6/2010 | Balser et al. | 297/216.1 |
| 2002/0079725 A1* | 6/2002 | Ruff et al. | 297/216.13 |
| 2008/0156602 A1* | 7/2008 | Hiemenz et al. | 297/216.1 X |
| 2010/0109393 A1* | 5/2010 | Hansen | 297/216.1 |
| 2010/0117408 A1* | 5/2010 | Hansen | 297/216.1 |
| 2010/0207433 A1* | 8/2010 | Hahn | 297/216.1 |

* cited by examiner

*Primary Examiner* — Rodney B White
(74) *Attorney, Agent, or Firm* — Barnes & Thornburg LLP

(57) ABSTRACT

A restraint system for may include a vehicle seat suspended above a floor of a vehicle and a restraint harness coupled to the vehicle seat and configured to restrain an occupant of the seat. The restraint harness may include at least one shoulder web configured to extend over a shoulder of an occupant of the seat and at least one lap web configured to extend over a lap of the occupant. At least one deformable member may be attached to the vehicle seat and configured to deform and dissipate energy when a force is applied thereto by the at least one shoulder web in response to an upward transient force of sufficient magnitude applied to the vehicle seat. A restraint harness pre-tensioning system may be responsive to a signal produced by a vehicle event sensor to tighten the at least one lap web about the occupant.

13 Claims, 4 Drawing Sheets

RESTRAINT SYSTEM FOR A SUSPENDABLE VEHICLE SAFETY SEAT

CROSS-REFERENCE TO RELATED APPLICATION

This patent application claims priority to, and the benefit of, U.S. Provisional Patent Application No. 61/125,328 filed Apr. 24, 2008, the disclosure of which is incorporated herein by reference.

FIELD OF THE INVENTION

The present invention relates generally to seats for motor vehicles, and more specifically to such seats that are configured to be generally suspended above a floor of a motor vehicle.

BACKGROUND

It may be desirable in some applications to suspend at least one seat above a floor of a motor vehicle when transporting occupants therein. It may further be desirable in such applications to provide a system for pre-tensioning a restraint harness mounted to such a seat upon detection of one or more impending vehicle related events for the purpose of tightening at least a portion of the restraint harness about an occupant of the seat in advance of the one or more vehicle related events.

SUMMARY

The present invention may comprise one or more of the features recited in the attached claims, and/or one or more of the following features and combinations thereof. A restraint system for a suspendable vehicle safety seat may comprise a vehicle seat suspended above a floor of a vehicle and a restraint harness coupled to the vehicle seat and configured to restrain an occupant of the seat. The restraint harness may comprise at least one shoulder web configured to extend over a shoulder of an occupant of the seat and at least one lap web configured to extend over a lap of the occupant. At least one deformable member may be attached to the vehicle seat and may be configured to deform and dissipate energy when a force is applied thereto by the at least one shoulder web in response to an upward transient force of sufficient magnitude applied to the vehicle seat. A restraint harness pre-tensioning system may be responsive to a signal produced by a vehicle event sensor to tighten the at least one lap web about the occupant.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
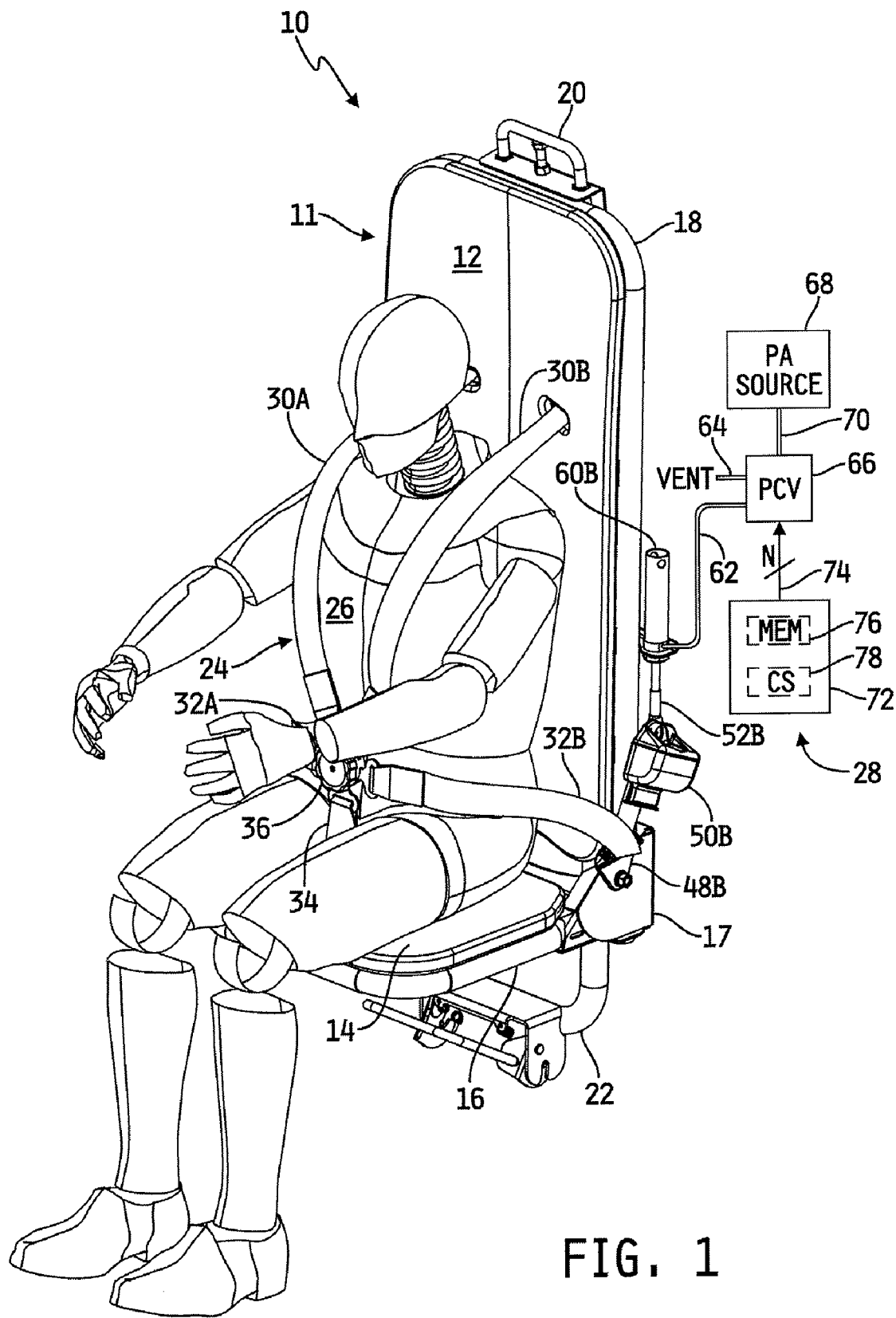
FIG. 1 is a front perspective view of one illustrative embodiment of a restraint system for a suspendable vehicle safety seat assembly shown with a restraint harness of the restraint system in a normal, non-pre-tensioned position.
Figure 4:
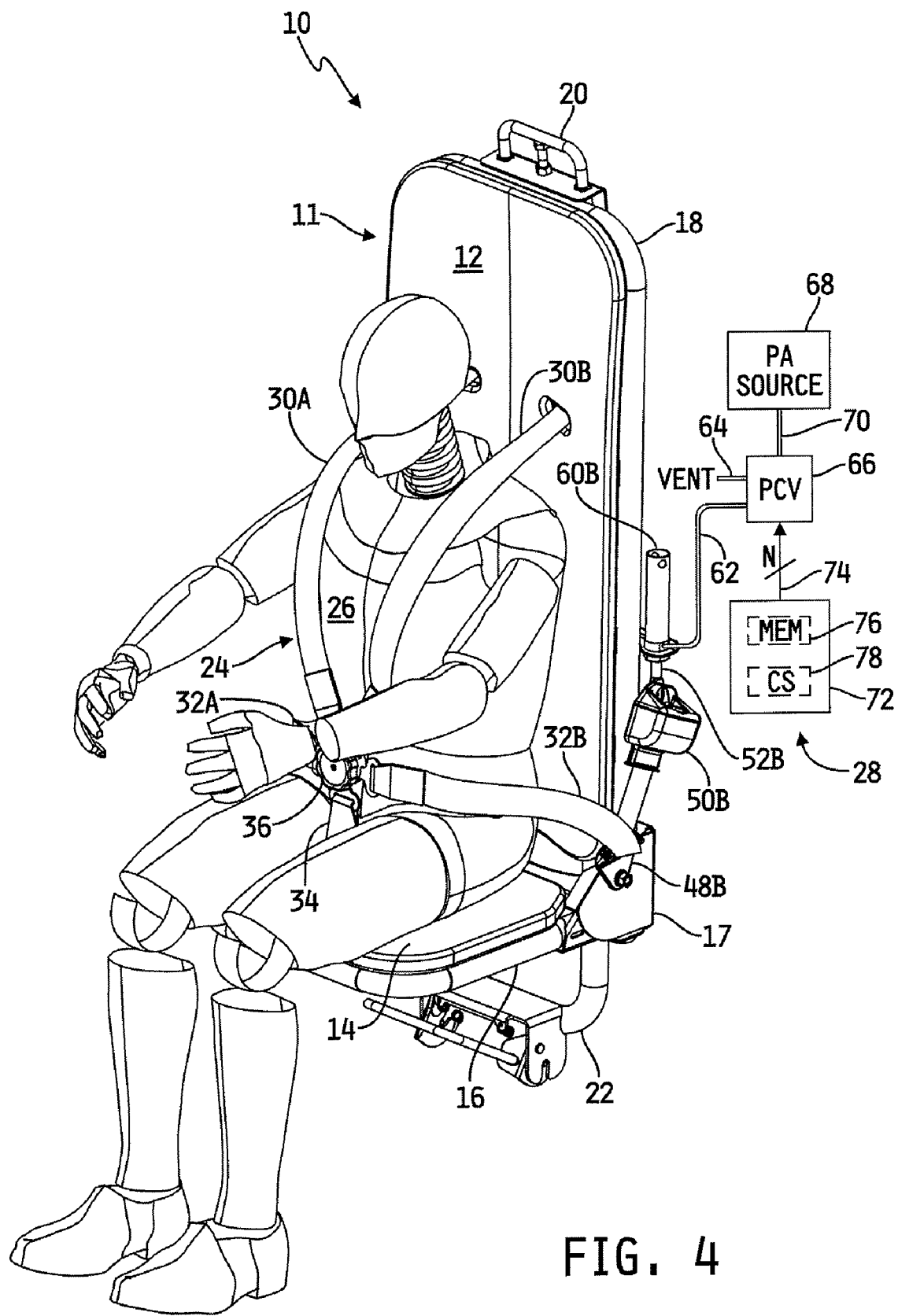
FIG. 4 is a front perspective view similar to FIG. 1 with the restraint harness shown in a pre-tensioned position.

Referring now to FIG. 1, a front perspective view is shown of one illustrative embodiment of a restraint system 10 for a suspendable vehicle safety seat assembly 11 shown with a restraint harness 24 of the restraint system 10 in a normal, non-pretensioned position. The suspendable vehicle safety seat assembly 11 includes a seat back 12 mounted to a seat back frame 18 and a seat bottom 14 mounted to a seat bottom frame 16. The seat bottom frame 16 and seat back frame 18 are illustratively joined by a seat frame 17. A seat base frame 22 is movably mounted to the seat frame 17 and extends downwardly from the bottom of the seat frame 17 as illustrated in FIGS. 1 and 4. An occupant 26 is shown seated and supported on the seat bottom 14, and the occupant 26 is restrained in the seat assembly 11 via a restraint harness 24 that is mounted to the seat assembly 11. In one embodiment, the motor vehicle carrying the restraint system 10 is a joint light tactical vehicle (JLTV), although this disclosure contemplates embodiments in which the motor vehicle may be any conventional motor vehicle.

The seat assembly 11 includes a top mounting bracket 20 that is configured to be rigidly mounted to a ceiling structure of the vehicle carrying the restraint system 10. Various conventional structures may be used to rigidly mount the seat assembly 11 to the ceiling structure of the vehicle carrying the restraint system 10, and example mounting structures include, but should not be limited to, a single rigid post, bar or beam, a plurality of rigid posts, bars or beams, or the like, and may be constructed of, for example, one or any combination of steel or other metal composite, a rigid polymer compound, wood, or the like. In any case, it will be understood that such mounting structures are provided only by way of example, and should not be considered to be limiting in any way. This disclosure contemplates alternate embodiments in which the seat assembly 11 may be rigidly or semi-rigidly mounted to one or more walls of the motor vehicle, or to a combination of one or more walls of the motor vehicle and the ceiling of the motor vehicle. In any case, however, the seat assembly 11 will be suspended above the floor of the vehicle and may further be selectively removable from the mounting structures and/or the support surface(s) to which the assembly 11 is suspended. This disclosure additionally contemplates embodiments in which the seat assembly 11 may or may not be portable and/or stowable.

In the illustrated embodiment, the seat base frame 22 is a generally U-shaped tubular member having two generally parallel and vertically extending portions that are joined by a generally lateral portion extending between the two vertically extending portions. The two generally vertically extending portions are illustratively movable in a vertical direction relative to the seat frame 17 such that the remainder of the seat assembly 11 is vertically movable relative to the seat frame 17 (see FIG. 2). In one illustrative embodiment, the seat base frame 22 is configured to be mounted to a floor of the vehicle carrying the seat assembly 11 to prevent, or at least limit, forward, rearward and sideways movement of the bottom of the seat assembly 11 relative to the vehicle carrying the seat assembly 11, but not to limit vertical movement of the seat assembly 11 relative to the floor of the vehicle.

Illustratively, the restraint harness 24 is a multiple-point restraint harness, and in the example embodiment shown in FIGS. 1-4 the restraint harness 24 is a 5-point restraint harness. In the illustrated embodiment, for example, the restraint harness 24 includes a pair of shoulder webs 30A and 30B each having a free end and an opposite end. The free ends of the shoulder webs 30A and 30B are configured to releasably engage a central web engagement member 36. In one embodiment, the free ends of each of the webs 30A and 30B comprise a conventional tongue, and the central web engagement member 36 comprises a corresponding pair of conventional buckles that are configured to releasably engage the tongues defined at the free ends of the webs 30A and 30B. Alternatively, the free ends of the webs 30A and 30B may define conventional buckles and the central web engagement member 26 may define conventional tongues that are configured to be releasably engaged by the buckles defined at the free ends of the webs 320 and 30B.

Figure 2:
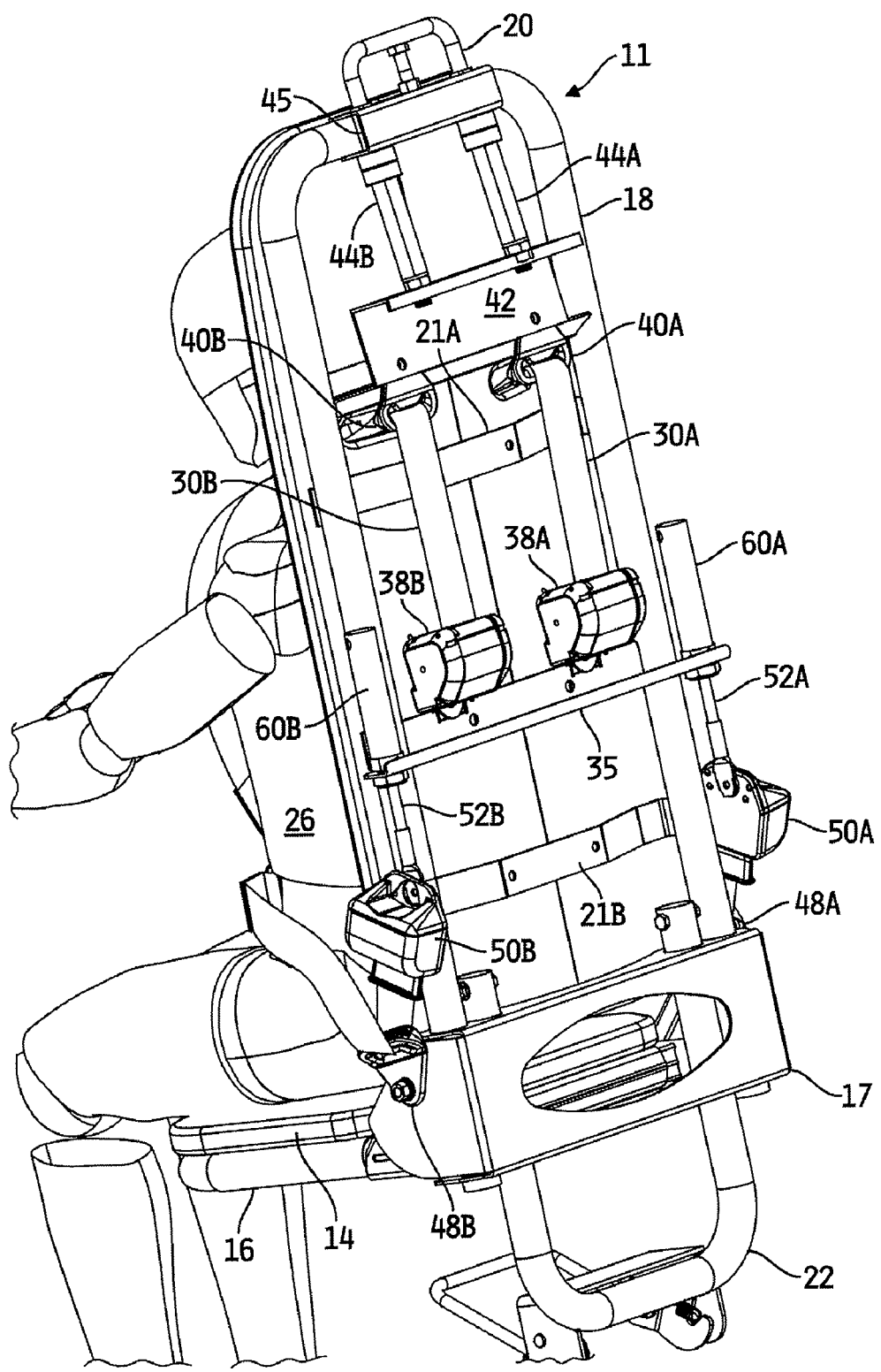
FIG. 2 is a rear perspective view of the embodiment illustrated in FIG. 1.
Figure 3:
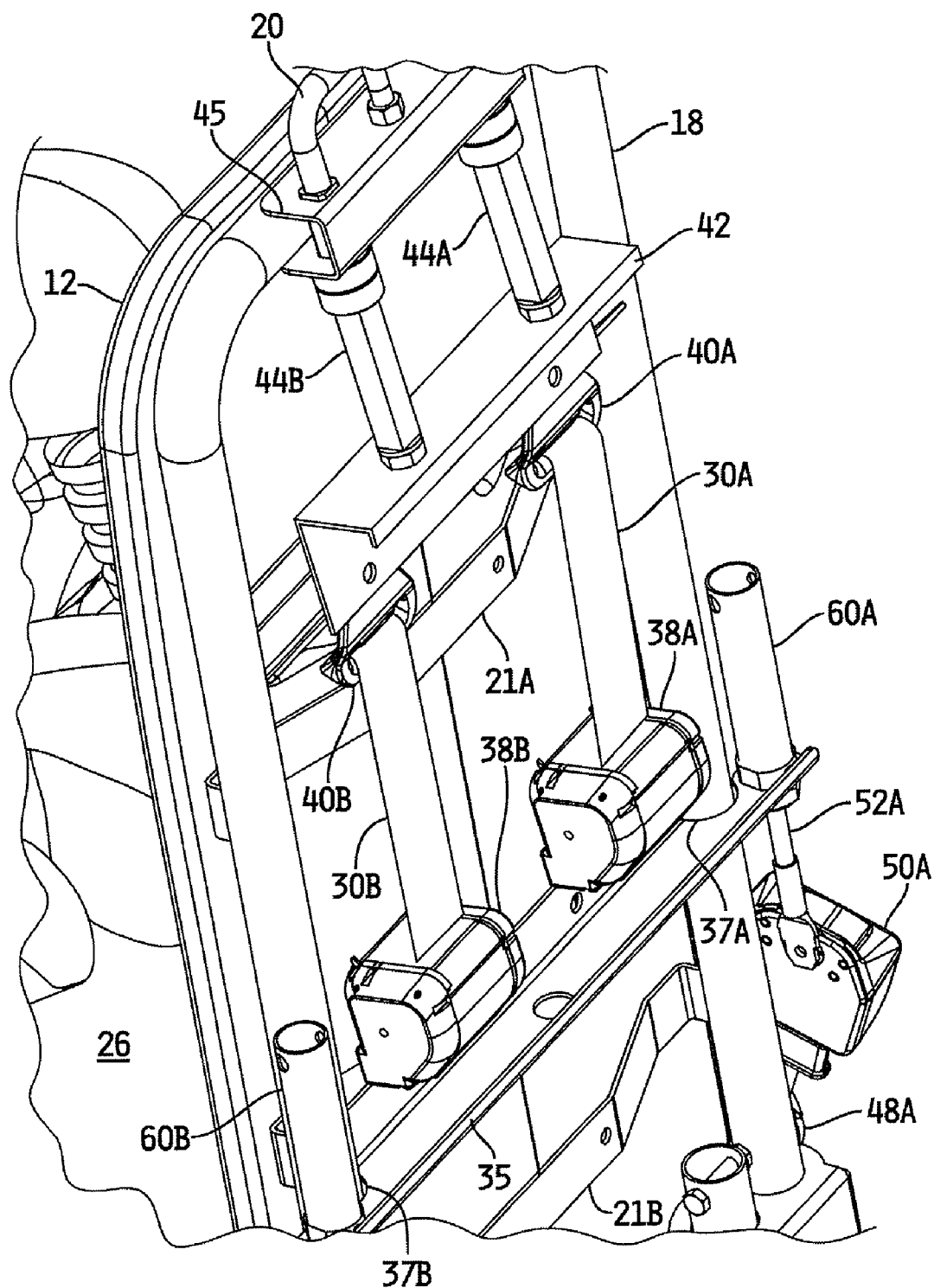
FIG. 3 is a magnified view a portion of FIG. 2 with the restraint harness removed for clarity of illustration.

Referring now to FIGS. 1-3, the opposite ends of the shoulder webs 30A and 30B extend over the shoulders of the occupant 26, through the seat back 12, through web guides 40A and 40B respectively, and are then attached to conventional retractors 38A and 38B respectively. The retractors 38A and 38B are illustratively mounted to a cross-member 35 that extends laterally between the generally parallel frame members of the seat back frame 18 that extend vertically along opposite sides of the seat back 12. The cross-member 35 is illustratively attached and secured to the seat back frame 18 and/or to the seat back 12. The retractors 38A and 38B are conventional, and in the illustrated embodiment the retractors 38A and 38B are conventional inertial-locking retractors, i.e., configured to lock and prevent movement of the webs 30A and 30B upon detection of a transient force greater than a threshold transient force. The web guides 40A and 40B are illustratively secured to a plate or bracket 42 which is coupled to the top mounting bracket 20 via a pair of deformable members 44A and 44B. As most clearly illustrated in FIG. 3, the top mounting bracket 20 is affixed at opposite ends thereof to the deformable members 44A and 44B respectively through a bracket 45 that is affixed or mounted to the top portion of the seat back frame 18. The plate or bracket 42 is not attached to the seat back 12 or to the seat back frame 18, but is instead attached to the deformable members 44A and 44B such that the plate or bracket 42 is coupled to the bracket 45 and the top mounting bracket 20 via the deformable members 44A and 44B.

The deformable members 44A and 44B are conventional and are generally configured to controllably reduce in length when a sufficiently large force is exerted in the upward direction against the plate 42 with the top mounting bracket 20 rigidly secured to the ceiling and/or wall(s) of the vehicle carrying the seat assembly 11. The deformable members 44A and 44B illustratively have an internal structure and/or geometry that is configured to crush or strip such that the length of the deformable members 44A and 44B reduces at a specified rate as the plate or bracket 42 moves toward the top mounting bracket 20 and the bracket 45 under a force applied upwardly to the plate or bracket 42 that is great enough to cause the deformable members 44A and 44B to begin deforming. In one example embodiment, which should not be considered to be limiting in any way, the deformable members 44A and 44B are provided in the form of a honeycomb structure designed to crush, and thereby reduce in length, at a specified rate as the plate or bracket 42 moves upwardly toward the top mounting bracket 20 under a force applied upwardly to the plate or bracket 42 that is great enough to cause the deformable members 44A and 44B to begin deforming. As the deformable members 44A and 44B deform and therefore reduce in length under this upward force, the deformable members 44A and 44B dissipate energy resulting from the upward force. Through appropriate design of the deformable members 44A and 44B, the resulting acceleration rate of the plate or bracket 42 relative to the top mounting bracket 20 and bracket 45 is controlled. It will be understood that although the seat assembly is illustrated and described herein as including two such deformable members 44A and 44B, this disclosure contemplates alternate embodiments that include more or fewer deformable members.

Referring now to FIGS. 1 and 2, the restraint harness 24 further includes a pair of lap webs 32A and 32B each of which have a free end and an opposite end. The free ends of the lap webs 32A and 32B are configured to releasably engage the central web engagement member 36. In one embodiment, the free ends of each of the lap webs 32A and 32B comprise a conventional tongue, and the central web engagement member 36 comprises a corresponding pair of conventional buckles that are configured to releasably engage the tongues defined at the free ends of the lap webs 32A and 32B. Alternatively, the free ends of the lap webs 32A and 32B may define conventional buckles and the central web engagement member 36 may define conventional tongues that are configured to be releasably engaged by the buckles defined at the free ends of the lap webs 32A and 32B. In any case, the opposite ends of the lap webs 32A and 32B extend through web guides 48A and 48B respectively, and are then attached to conventional retractors 50A and 50B respectively. In the illustrated embodiment, the retractors 50A and 50B are conventional inertial-locking retractors such that the retractors 50A and 50B lock and prevent movement of the webs 32A and 32B relative thereto upon detection of a transient force greater than a threshold transient force. The web guides 48A and 48B are illustratively mounted to the seat frame 17, but may alternatively be mounted to any one or combination of the seat bottom frame 16, the seat frame 17, the seat back frame 18 and the seat base frame 22. The retractors 50A and 50B are mounted to elongated guide members 52A and 52B that form part of a restraint harness pre-tensioning system 28 as will be described in greater detail hereinafter, although this disclosure contemplates alternate embodiments in which the retractors 50A and 50B are mounted to the seat frame 17 and/or the seat base frame 22. In any case, the lap webs 32A and 32B are configured to extend about the lap of the occupant 26 as illustrated in FIGS. 1, 2 and 4.

In the illustrated embodiment, the restraint harness assembly 24 further includes a crotch web or strap 34 having one end mounted to the seat 14 and/or to the seat bottom frame 16, and an opposite end defining a conventional tongue. The central web engagement member 36 defines a conventional buckle that is configured to releasably engage the tongue member defined at the opposite end of the crotch web or strap 34. Alternatively, the opposite end of the crotch web or strap 34 may define a conventional buckle and the central web engagement member 36 may define a conventional tongue that is configured to be releasably engaged by the buckle defined at the opposite end of the crotch web or strap 34.

In the event that the vehicle seat assembly 11 experiences a transient upward force applied thereto, such as may occur when an explosive charge is activated under the vehicle and/or during certain vehicle impact and/or rollover events, the seat assembly 11 will generally move with, and at the same rate as, the vehicle because the top mounting bracket 20 is rigidly secured to the ceiling and/or wall(s) of the vehicle. The occupant 26, on the other hand, will generally move upwardly with greater acceleration, and thus at a higher rate of speed, than that of the seat assembly 11 just as an occupant generally moves forward with a greater acceleration, and thus at a higher rate of speed, than the vehicle during a frontal impact. During a transient upward force applied to the vehicle seat assembly 11 of sufficient magnitude, such as described above, the inertial-locking retractors 38A and 38B will lock, thereby preventing movement of the shoulder webs 30A and 30B relative thereto. As the occupant 26 moves upwardly relative to the seat assembly 11 under the transient force, the shoulders of the occupant 26 force the webs 30A and 30B upwardly against the web guides 40A and 40B, thus applying an upward force to the deformable members 44A and 44B. If the transient force is sufficiently great, the resulting force applied by the occupant 26 against the web guides 40A and 40B via the shoulder webs 30A and 30B causes the deformable members 44A and 44B to deform and reduce in length as described hereinabove. This deformation absorbs at least some of the energy of the transient force and thereby controls upward acceleration of the occupant 26 relative to the vehicle carrying the seat assembly 11 during the transient event.

In one alternative embodiment, the web guides 48A and 48B may be attached and secured to a plate or bracket that is coupled to a stationary component of the seat assembly 11 via one or more deformable members. In this embodiment, as the occupant 26 moves upwardly under a transient force applied upwardly against the seat assembly 11 as described hereinabove, the retractors 50A and 50B will lock if the magnitude of the transient force is sufficiently high and the occupant 26 will apply a corresponding upward force to the lap webs 32A and 32B which will be translated through the web guides 48A and 48B to the one or more deformable members that will deform as described above and thereby control the upward acceleration rate of the lap webs 32A and 32B relative to the vehicle seat assembly 11. This alternative embodiment may be used in addition to, or in place of, the plate 42, deformable member 44A, 44B and web guide 40A, 40B combination described hereinabove.

It will be further understood that while the restraint harness 24 has been illustrated in the drawings and described herein as being a 5-point restraint harness, this disclosure contemplates other embodiments in which the restraint harness 24 has more or fewer connection points. The restraint harness 24, while being a multiple-point restraint system, may thus alternatively be a 2-point, 3-point, 4-point or 6 or more point restraint harness.

In the illustrated embodiment, the restraint system 10 further includes a restraint harness pre-tensioning system 28 as briefly mentioned above. The pre-tensioning system 28 generally includes a pair of web actuators 60A and 60B that are secured to opposite ends of the cross member 35 such that the web actuator 60A is positioned adjacent to one side of the seat back 12 and the web actuator 60B is positioned adjacent to the opposite side of the seat back 12. The elongated guide member 52A extends downwardly from the web actuator 60A to a terminal end thereof which is mounted to the retractor 50A, and the elongated member 52B likewise extends downwardly from the web actuator 60B to a terminal end thereof which is mounted to the retractor 50B. The retractors 50A and 50B are thus suspended from the web actuators 60A and 60B respectively by the elongated guide members 52A and 52B respectively.

The web actuator 60A is illustratively fluidly coupled to one end of a fluid passage 62, the opposite end of which is connected to a pressurized air outlet of a conventional pressure control unit (PCU) 66 that receives pressurized air from a conventional pressurized air (PA) source 68 via at least one fluid passage 70. The pressure control unit 66 further includes a vent outlet that is fluidly coupled to ambient via an air passage 64 The pressure control unit 66 is electrically connected to a control circuit 72 via a number, N, of signal paths 74 where N may be any positive integer. The control circuit 72 is illustratively microprocessor-based and includes a memory 76 having instructions stored therein that are executable by the control circuit 72 to control operation of the web actuators 60A and 60B via control of the pressure control unit 66. The control circuit further includes, and/or is electrically connected to, a vehicle event sensor 78.

The web actuators 60A and 60B are generally controlled between retracted and extended position by the pressure control unit 66 in response to electronic control thereof by the control circuit 72 based on the signal produced by the vehicle event sensor 78. Under normal vehicle traveling conditions the instructions stored in the memory 76 cause the control circuit 72 to control the pressure control unit 66 to block pressurized air from the pressurized air source 68 from entering the pressure control unit 66 and to control the pressure control unit 66 to vent any pressurized air contained in the pressure control unit 66 to ambient via the fluid passage 64. This causes both elongated guide members 52A and 52B to extend downwardly along the sides of the seat back 12 such that the retractors 50A and 50B likewise extend downwardly toward the web guides 48A and 48B respectively. This is the normal position of the restraint harness pre-tensioning system 28, which is illustrated in FIGS. 1 and 2 and which generally occurs when the vehicle carrying the restraint system 10 is stationary or traveling under normal conditions. During vehicle events sensed by the vehicle event sensor 78 and provided to the control circuit 72 in the form of a sensory signal, the instructions stored in the memory 76 cause the control circuit 72 to control the pressure control unit 66 to receive pressurized air from the pressurized air source 68 and to control the pressure control unit 66 to pass pressurized air contained in the pressure control unit 66 to the web actuators 60A and 60B ambient via the fluid passage 62. This causes both elongated guide members 52A and 52B to retract upwardly along the sides of the seat back 12 such that the retractors 50A and 50B likewise retract upwardly toward the web actuators 60A and 60B respectively. This is the vehicle event position of the restraint harness pre-tensioning system 28, which is illustrated in FIG. 4 and which generally occurs when the vehicle carrying the restraint system 10 is undergoing, or is about to undergo, a vehicle event that is detectable by the vehicle event sensor 78.

The retractors 50A and 50B are illustratively conventional inertial locking retractors so that when the web actuators 60A and 60B are controlled by the control circuit 72 via the pressure control unit 66 from their extended positions, as illustrated in FIG. 1, to their retracted positions, as illustrated in FIG. 4, the lap webs 32A and 32B are tightened about the occupant 26. Conversely, when the web actuators 60A and 60B are controlled by the control circuit 72 via the pressure control unit 66 from their retracted positions, as illustrated in FIG. 4, to their extended positions, as illustrated in FIG. 1, the lap webs 32A and 32B are returned to their normal restraint positions about the occupant 26. The position of the restraint system 10 illustrated in FIG. 4 thus corresponds to the pre-tensioned position of the restraint harness 24 and the position of the restraint system 10 illustrated in FIG. 1 corresponds to the normal, non-pre-tensioned position of the restraint harness 24.

Further details relating to structural and operational features of one illustrative embodiment of the web actuators 60A and 60B are set forth in co-pending U.S. Patent Application Pub. No. 2007/0290535, which is assigned to the assignee of this disclosure, and the disclosure of which is incorporated herein by reference. It will be understood, however, that while the web actuators 60A and 60B are shown and described as being fluid pressure activated actuators, this disclosure contemplates alternative embodiments in which the web actuators 60A and 60B may be or include other conventional structures that are controllable between extended and retracted positions under the control of the control circuit 72. Examples of such other conventional structures include, but should not be limited to, electro-mechanical structures, pneumatically controlled structures, electro-magnetically controlled structures or the like.

As briefly described above, the control circuit 72 includes, or has access to a signal produced by, a vehicle event sensor 78, and the memory 76 has instructions stored therein that are executable by the control circuit 72 to control operation of the web actuators 60A and 60B based on the signal produced by the vehicle event sensor 78. In one illustrative embodiment, for example, the vehicle event sensor 78 may be or include at least one conventional vehicle roll over detection sensor. In this embodiment, the at least one roll over detection sensor 78 is operable to monitor one or more vehicle roll over conditions and produce at least one roll over signal indicative of a vehicle roll over event, and to provide the roll over signal to the control circuit 72. Alternatively or additionally, the vehicle event sensor 78 may be or include at least one vehicle impact sensor that is operable to monitor one or more vehicle impact conditions and produce at least one impact signal indicative of an impact of the vehicle above a threshold impact severity, and to provide the impact signal to the control circuit 72.

Those skilled in the art will recognize other sensors and/or systems that may be the vehicle event sensor 78 and/or be included in the vehicle event sensing system of the restraint harness pre-tensioning system 28, and any such other sensors and/or systems are intended to fall within the scope of this disclosure. Examples of such other sensors and/or sensor systems may include, but are not limited to, sensors and/or sensing systems for detecting impending collision, e.g., a collision avoidance sensing system, sensors and/or sensing systems for detecting vehicle sliding or skidding conditions, sensors and/or systems for detecting vehicle runaway conditions, or the like. Any one or combination of such sensors and/or systems are generally operable to produce a web pre-tension signal in response to a corresponding vehicle event, e.g., a vehicle rollover condition, a pending vehicle collision event, a vehicle sliding or skidding event, a vehicle runaway condition (e.g., a vehicle moving and possibly accelerating uncontrollably, such as with an accelerator pedal or cruise control system of the vehicle stuck during vehicle operation, the vehicle accelerating downhill and unable to be slowed by the vehicle brakes, etc.) or the like, and the control circuit 72 is responsive to such a web pre-tension signal to control the web actuators 60A and 60B, according to corresponding instructions stored in the memory 76, to retract the web guide members 52A, 52B and thereby tighten the lap webs 32A and 32B about the occupant 26 as described herein. Conversely, when no such vehicle event is present or impending, the vehicle event sensor or sensing system 78 is operable to produce a "normal" signal indicative of normal vehicle operating conditions, and the control circuit 72 is responsive to such a normal signal to control the web actuators 60A and 60B, according to corresponding instructions stored in the memory 76, to extend the web guide members 52A, 52B or allow the web guide members 52A, 52B to extend, such that the lap webs 32A and 32B extend about the occupant 26 in a conventional occupant restraining position.

It will be understood that the web actuators 60A and 60B are resettable in the sense that the actuators 60A and 60B return the web guides 52A and 52B, and thus the retractors 50A and 50B, to their normal, non-pre-tensioned positions when the control circuit 72 controls the pressure control unit 66 to evacuate air pressure therein via the vent passageway 64.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A restraint system for a suspendable vehicle safety seat, the restraint system comprising:
   a vehicle seat suspended above a floor of a vehicle,
   a restraint harness coupled to the vehicle seat and configured to restrain an occupant of the seat, the restraint harness comprising at least one shoulder web configured to extend over a shoulder of an occupant of the seat and at least one lap web configured to extend over a lap of the occupant,
   at least one web guide having the at least one shoulder web extending therethrough,
   at least one deformable member attached at one end to the vehicle seat and attached at an opposite end to the at least one web guide, the at least one deformable member configured to deform and dissipate energy when a force is applied thereto by the at least one shoulder web translated through the at least one web guide in response to an upward transient force of sufficient magnitude applied to the vehicle seat, and
   a restraint harness pre-tensioning system responsive to a signal produced by a vehicle event sensor to tighten the at least one lap web about the occupant.

2. The restraint system of claim 1 wherein the vehicle event sensor is a vehicle rollover sensor configured to produce a rollover signal when rollover of a vehicle carrying the seat is imminent,
   and wherein the restraint harness pre-tensioning system is configured to be responsive to the rollover signal to tighten the at least one lap web about the occupant.

3. The restraint system of claim 1 wherein the vehicle event sensor is an impact sensor configured to produce an impact signal upon detection of a sufficiently severe impact of a vehicle carrying the seat with another object,
   and wherein the restraint harness pre-tensioning system is configured to be responsive to the impact signal to tighten the at least one lap web about the occupant.

4. The restraint system of claim 1 wherein the vehicle event sensor comprises a collision avoidance impact system configured to produce a web pre-tensioning signal upon detection of at least one of an impact of a vehicle carrying the seat with another object, skidding of the vehicle, sliding of the vehicle and runaway of the vehicle,
   and wherein the restraint harness pre-tensioning system is configured to be responsive to the web pre-tensioning signal to tighten the at least one lap web about the occupant.

5. The system of claim 1 wherein the restraint harness pre-tensioning system comprises:
   a pressurized air source,
   a pressure control unit fluidly coupled to the pressurized air source,
   a web actuator including a web guide fluidly coupled to the pressure control unit,
   an inertial-locking retractor attached to the web guide and to the at least one lap web, and a control circuit electrically connected to the pressure control unit, the pressure control unit including a memory having instructions stored therein that are executable by the control circuit to control the pressure control unit to supply pressurized air from the pressurized air source to the web actuator to cause the web actuator to retract the web guide and retractor to thereby tighten the at least one lap web about the occupant in response to a web pre-tensioning signal produced by the vehicle event sensor.

6. The restraint system of claim 5 wherein the instructions stored in the memory included instructions that are executable by the control circuit to control the pressure control unit to vent pressurized air from the web actuator to cause the web actuator to extend the web guide and retractor to normal operative positions relative to the vehicle seat when the signal produced by the vehicle event sensor is not the web pre-tensioning signal.

7. The restraint system of claim 1 further comprising:
a bracket connected between the opposite end of the at least one deformable member
and the at least one web guide,
and wherein force applied by the occupant to the shoulder web in response to the upward transient force of sufficient magnitude applied to the vehicle seat is translated through the at least one web guide and the bracket to the at least one deformable member, thereby causing the at least one deformable member to deform and dissipate energy.

8. A restraint system for a suspendable vehicle safety seat, the restraint system comprising:
a vehicle seat suspended above a floor of a vehicle,
a restraint harness coupled to the vehicle seat and configured to restrain an occupant of the seat, the restraint harness comprising a first shoulder web configured to extend over a first shoulder of an occupant of the seat and a first lap web configured to extend over a lap of the occupant,
at least one deformable member attached at one end to the vehicle seat,
a bracket connected to an opposite end of the at least one deformable member,
a first web guide attached to the bracket and having one of the first shoulder web and the first lap web extending therethrough,
wherein force applied by the occupant to the one of the first shoulder web and the first lap web in response to an upward transient force of sufficient magnitude applied to the vehicle seat is translated through the web guide and the bracket to the at least one deformable member, thereby causing the at least one deformable member to deform and dissipate energy.

9. The restraint system of claim 8 wherein the first shoulder web extends through the web guide such that the force applied by the occupant to the first shoulder web in response to the upward transient force applied to the vehicle seat is translated through the web guide and the bracket to the at least one deformable member.

10. The restraint harness of claim 9 further comprising:
a second shoulder web configured to extend over a second shoulder of the occupant, and
a second web guide attached to the bracket and having the second shoulder web extending therethrough,
and wherein force applied by the occupant to the first and second shoulder webs in response to the upward transient force of sufficient magnitude applied to the vehicle seat is translated through the first and second web guides and the bracket to the at least one deformable member, thereby causing the at least one deformable member to deform and dissipate energy.

11. The restraint system of claim 10 further comprising a restraint harness pre-tensioning system responsive to a signal produced by a vehicle event sensor to tighten the at least one lap web about the occupant.

12. The restraint system of claim 8 wherein the first lap web extends through the web guide such that the force applied by the occupant to the first lap web in response to the upward transient force applied to the vehicle seat is translated through the web guide and the bracket to the at least one deformable member.

13. The restraint harness of claim 12 further comprising:
a second lap web configured to extend over the lap of the occupant, and
a second web guide attached to the bracket and having the second lap web extending therethrough,
and wherein force applied by the occupant to the first and second lap webs in response to the upward transient force of sufficient magnitude applied to the vehicle seat is translated through the first and second web guides and the bracket to the at least one deformable member, thereby causing the at least one deformable member to deform and dissipate energy, and
a restraint harness pre-tensioning system responsive to a signal produced by a vehicle event sensor to tighten the at least one lap web about the occupant.

* * * * *